United States Patent
Satoh

(10) Patent No.: US 7,437,021 B2
(45) Date of Patent: Oct. 14, 2008

(54) IMAGE PROCESSING DEVICE AND METHOD

(75) Inventor: Jin Satoh, Tokyo (JP)

(73) Assignee: Sony Corporation, Tokyo (JP)

( * ) Notice: Subject to any disclaimer, the term of this patent is extended or adjusted under 35 U.S.C. 154(b) by 632 days.

(21) Appl. No.: 10/467,543

(22) PCT Filed: Dec. 11, 2002

(86) PCT No.: PCT/JP02/12966

§ 371 (c)(1),
(2), (4) Date: Mar. 22, 2004

(87) PCT Pub. No.: WO03/054800

PCT Pub. Date: Jul. 3, 2003

(65) Prior Publication Data

US 2004/0196290 A1    Oct. 7, 2004

(30) Foreign Application Priority Data

Dec. 12, 2001    (JP)    ............... 2001-379349

(51) Int. Cl.
*G06K 9/60*    (2006.01)
*G06K 9/36*    (2006.01)
*G06F 15/80*    (2006.01)
*G09G 5/00*    (2006.01)

(52) U.S. Cl. ............... 382/304; 382/260; 382/285; 382/303; 345/502; 345/505; 345/582; 345/587

(58) Field of Classification Search .............. 345/502, 345/503, 504, 505, 506, 587, 582; 382/260, 382/283, 285, 302, 303, 304, 307; 700/4, 700/5

See application file for complete search history.

(56) References Cited

U.S. PATENT DOCUMENTS 5,359,674 A  * 10/1994  van der Wal ............... 382/261
5,493,643 A  *  2/1996  Soderberg et al. ........... 345/505

(Continued)

FOREIGN PATENT DOCUMENTS

JP    03048979    3/1991

(Continued)

OTHER PUBLICATIONS

IEEE, IEEE 100 : the authoritative dictionary of IEEE standar terms, 2000, IEEE, 7th edition, pp. 435.*

*Primary Examiner*—Samir A Ahmed
*Assistant Examiner*—Michael A Newman
(74) *Attorney, Agent, or Firm*—Finnegan, Henderson, Farabow, Garrett & Dunner, L.L.P.

(57) ABSTRACT

An image processing apparatus and method which can achieve a reduction in size of the crossbar circuit and achieve a higher speed of processing, which perform DDA processing (ST11), then read out texture data from a memory (ST12), perform sub-word reallocation processing (ST13), then perform texture-filtering (ST14), then globally distribute data by the crossbar circuit 13 to a first operation processing element of each processing module (ST15), then perform processing at the pixel level, specifically use the texture data after filtering and the various types of data after rasterization to perform operations by pixel units and draw the pixel data passing the various types of tests in the processing at the pixel level to a frame buffer on a memory module (ST16).

5 Claims, 9 Drawing Sheets

U.S. PATENT DOCUMENTS

| | | | | |
|---|---|---|---|---|
| 5,566,284 | A * | 10/1996 | Wakayama | 345/587 |
| 5,638,533 | A * | 6/1997 | Law | 711/157 |
| 5,805,915 | A * | 9/1998 | Wilkinson et al. | 712/20 |
| 5,956,744 | A * | 9/1999 | Robertson et al. | 711/122 |
| 6,104,842 | A * | 8/2000 | Rich | 382/304 |
| 6,115,131 | A | 9/2000 | Payne | |
| 6,130,967 | A * | 10/2000 | Lee et al. | 382/302 |
| 6,157,384 | A * | 12/2000 | Oka et al. | 715/848 |
| 6,452,603 | B1 * | 9/2002 | Dignam | 345/582 |
| 6,661,424 | B1 * | 12/2003 | Alcorn et al. | 345/611 |
| 6,763,150 | B1 * | 7/2004 | MacDonald | 382/304 |
| 6,937,250 | B1 * | 8/2005 | Schilling et al. | 345/582 |

FOREIGN PATENT DOCUMENTS

| | | |
|---|---|---|
| JP | 05108347 | 4/1993 |
| JP | 08335273 | 12/1996 |
| JP | 10-97394 | 4/1998 |

* cited by examiner

RELATED ART

IMAGE PROCESSING DEVICE AND METHOD

TECHNICAL FIELD

The present invention relates to an image processing apparatus and method thereof wherein a plurality of processing devices share processing data to perform parallel processing.

BACKGROUND ART

In recent years, graphic LSIs for performing 3D computer graphics by hardware at a high speed have spread remarkably. In particular, in game systems and personal computers (PC), such graphic LSIs are often mounted as standard equipment.

Further, the technological advances being made in graphic LSIs have been fast. Expansion of functions such as in the "Vertex Shader" and "Pixel Shader" employed in "DirectX" have been continuing and performance has been improved at a pace faster than that of the CPUs.

In order to improve the performance of a graphic LSI, it is effective not only to raise the operating frequency of the LSI, but also to utilize the techniques of parallel processing. The techniques of parallel processing may be roughly classified as follows.

First is a parallel processing method by area division, second is a parallel processing method at a primitive level, and third is a parallel processing method at a pixel level.

The above classification is based on the particle size of the parallel processing. The particle size of the area division parallel processing is the roughest, while the particle size of the pixel level parallel processing is the finest. These techniques will be summarized below.

Parallel Processing by Area Division

This is a technique dividing a screen into a plurality of rectangular areas and performing parallel processing while assigning areas to a plurality of processing units to take charge of.

Parallel Processing at Primitive Level

This is a technique of imparting different primitives (for example triangles) to a plurality of processing units and making them operate in parallel.

A view conceptually showing parallel processing at the primitive level is shown in FIG. 1.

In FIG. 1, PM0 to PMn−1 indicate different primitives, PU0 to PUn−indicate processing units, and MM0 to MMn−1 indicate memory modules.

When primitives PM0 to PMn−1 having a relatively equal large size are given to the processing units PU0 to PUn−1, the loads on the processing units PU0 to PUn−1 are balanced and efficient parallel processing can be carried out.

Parallel Processing at Pixel Level

This is the technique of parallel processing of the finest particle size.

FIG. 2 is a view conceptually showing parallel processing at the primitive level based on the technique of parallel processings at the pixel level.

As shown in FIG. 2, in the technique of parallel processing at the pixel level, when rasterizing triangles, pixels are generated in units of rectangular areas referred to as "pixel stamps PS" comprised of pixels arrayed in a 2×8 matrix.

In the example of FIG. 2, a total of eight pixel stamps from the pixel stamp PS0 to the pixel stamp PS7 are generated. A maximum of 16 pixels included in these pixel stamps PS0 to PS7 are simultaneously processed.

This technique has an efficiency in parallel processing better by the amount of fineness of the particle size in comparison with the other techniques.

In the case of parallel processing by area division explained above, however, in order to make the processing units operate in parallel efficiently, it is necessary to classify objects to be drawn in the areas in advance, so the load of the scene data analysis is heavy.

Further, when not starting drawing after one frame's worth of the scene data is all present, but drawing in the so-called immediate mode of starting drawing immediately when object data is given, the parallel property cannot be achieved.

Further, in the case of parallel processing at the primitive level, in actuality, there is variation in sizes of the primitives PM0 to PMn−1 composing the object, so a difference arises in the time for processing one primitive among the processing units PU0 to PUn−1. When this difference becomes large, the areas which the processing units draw in also largely differ and the locality of the data is lost, so for example the DRAM comprising the memory modules frequently makes page errors and the performance is lowered.

Further, in the case of this technique, there is also the problem of a high interconnect cost. In general, in hardware for graphics processing, in order to broaden the band width of the memory, a plurality of memory modules is used for memory interleaving.

At this time, as shown in FIG. 1, it is necessary to connect all processing units PU0 to PUn−1 and the built-in memory modules MM0 to MMn.

On the other hand, in the case of the parallel processing at the pixel level, as described above, there is the advantage that the efficiency of the parallel processing becomes better by the amount of fineness of the particle size. As the processing including actual filtering, processing is performed by the routine shown in FIG. 3.

That is, DDA (digital differential analyzer) parameters, for example, the inclinations of various types of data (Z, texture coordinates, colors, etc.) required for rasterization and other DDA parameters are calculated (ST1).

Next, texture data is read out from a memory (ST2), sub-word reallocation is performed (ST3), then the data is globally distributed to the processing units by a crossbar circuit (ST4).

Next, texture filtering is performed (ST5). In this case, the processing units PU0 to PU3 perform four-neighbor interpolation or other filtering by using read texture data and a decimal fraction obtained when calculating a (u, v) address.

Next, processing at the pixel level (per-pixel operation) is performed, specifically, texture data after the filtering and various types of data after rasterization are used for operations on pixel units (ST5).

Further, pixel data passing various types of tests in the processing at the pixel level is drawn in a frame buffer and Z-buffer on the memory modules MM0 to MM3.

By the way, memory access of the texture read system differs from memory access of the graphics generation system, therefore it is necessary to read data from a memory belonging to another module.

Therefore, for memory access of the texture read system, an interconnect such as a crossbar circuit as described above is necessary.

However, a related image processing apparatus, as described above, globally distributes data to the processing units, then performs texture filtering, so there are the disadvantages that the amount of data globally distributed is large (for example, 4 Tbps), the crossbar circuit serving as the global bus becomes large in size, and an increase in the speed of processing is obstructed from the viewpoint of interconnect delay etc.

DISCLOSURE OF THE INVENTION

An object of the present invention is to provide an image processing apparatus and method thereof that can achieve a reduction in the size of a crossbar circuit and achieve an increase in speed of processing.

To achieve the above object, a first aspect of the present invention is an image processing apparatus in which a plurality of processing modules share processing data to perform parallel processing, wherein: the plurality of processing modules each comprise: a memory module storing at least data relating to filtering, a processing circuit for obtaining data for filtering and performing assigned processing determined in advance by corresponding memory interleaving based on the processing data, a first operation processing element for performing operation processing in pixel units based on assigned processing data and data after filtering obtained at said processing circuit, and a second operation processing element for performing filtering based on the data for filtering obtained by said processing circuit and the data relating to filtering stored in said memory module and receiving operation processing data from the first operation processing element, then drawing the operation processed data to the memory module and further comprising a crossbar circuit which is a global bus for connecting a plurality of first operation processing elements and a plurality of second operation processing elements of said processing modules, supplying data for filtering obtained by said processing circuit in each processing module to a second operation processing element in the same processing module, supplying data after filtering from a second operation processing element in each processing module to a first operation processing element in a processing module corresponding to the processing, and supplying the operation processing data from the first operation processing element to the second operation processing element.

In the first aspect, the processing circuit of each processing module comprises a means for adjusting time so that the processing time of the assigned data becomes equal to time when the data after filtering is supplied to the first operation processing element.

A second aspect of the present invention is an image processing method in which a plurality of processing modules share processing data to perform parallel processing: obtaining data for filtering and performing assigned process determined in advance by corresponding memory interleaving based on the processing data in each processing module; performing filtering based on the obtained data for filtering and data relating to filtering stored in a memory module; supplying data after filtering in each processing module; through a global bus, to a predetermined processing module; and performing operation processing in pixel unit based on the obtained assigned processing data and the data after filtering, and drawing the operation processed data to said memory module, in a processing module receiving the data after filtering.

Preferably, the method further comprises a step of adjusting each processing module time so that processing time of the assigned data becomes equal to time when the data after filtering is supplied.

Moreover, in the present invention, the processing requiring the filtering is processing relating to texture.

Further, the above parallel processing is parallel processing at the pixel level.

According to the present invention, for example the setup circuit performs an operation on the vertex data, sets up a primitive, and outputs the assigned texture's worth of setup information to the processing modules.

The processing circuit of each processing module calculates for example the DDA parameters, specifically the inclination etc. of various types of data (Z, texture coordinates, colors, etc.) and other DDA parameters required for rasterization based on information from the setup circuit.

Further, each processing circuit judges whether for example a triangle is its assigned area based on the parameter data and, when its assigned area, performs rasterization.

Moreover, each processing circuit calculates the MipMap level by calculating the LOD and calculates the (u, v) address calculation for texture access.

Then, each processing circuit outputs the obtained texture coordinates and address information for texture access etc. to the second operation processing element.

On the other hand, each processing circuit supplies the color and other information other than the texture obtained to the first operation processing element.

Further, the second operation processing element of each processing module receives coordinate data and address data relating to texture supplied from the processing circuit, reads out the texture data from memory module, and performs four-neighbor interpolation or other texture filtering using the read texture data and a decimal fraction obtained at the time of calculation of the (u, v) address.

The texture data after filtering from a second operation processing element is supplied via the crossbar circuit to for example the first operation processing element of the processing module having a frame buffer corresponding to a stamp.

The first operation processing element of a processing module performs processing at the pixel level based on data other than the texture information supplied from the processing circuit and data after texture filtering by the second operation processing element of a processing module received through the crossbar circuit and outputs the result to the second operation processing element.

Then, the second operation processing element receives the result of processing at the pixel level supplied from the first operation processing element and draws the pixel data passing various types of tests in the processing at the pixel level in the memory module.

The above processing is performed in parallel in the modules.

BEST MODE FOR CARRYING OUT THE INVENTION

Figure 1:
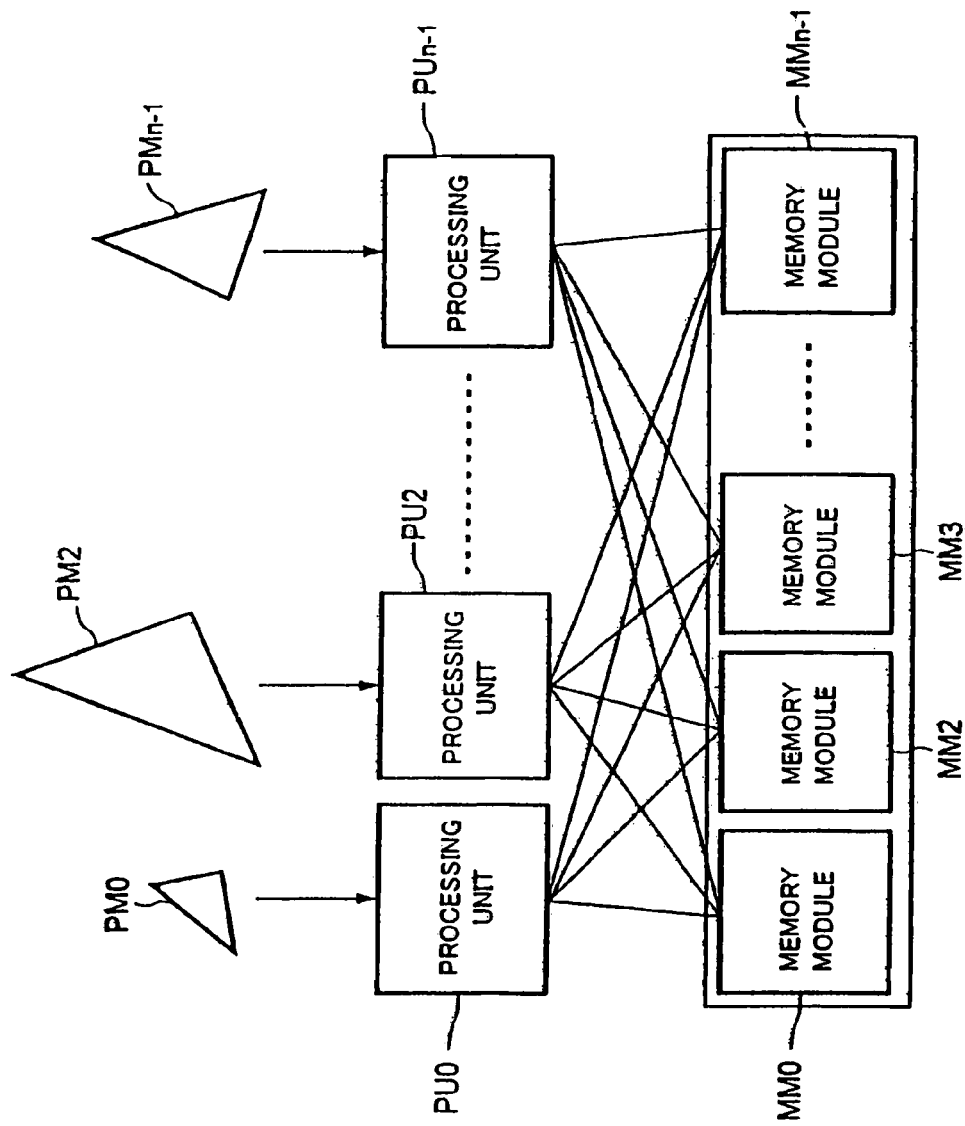
FIG. 1 is a view showing conceptually parallel processing at a primitive level.
Figure 2:
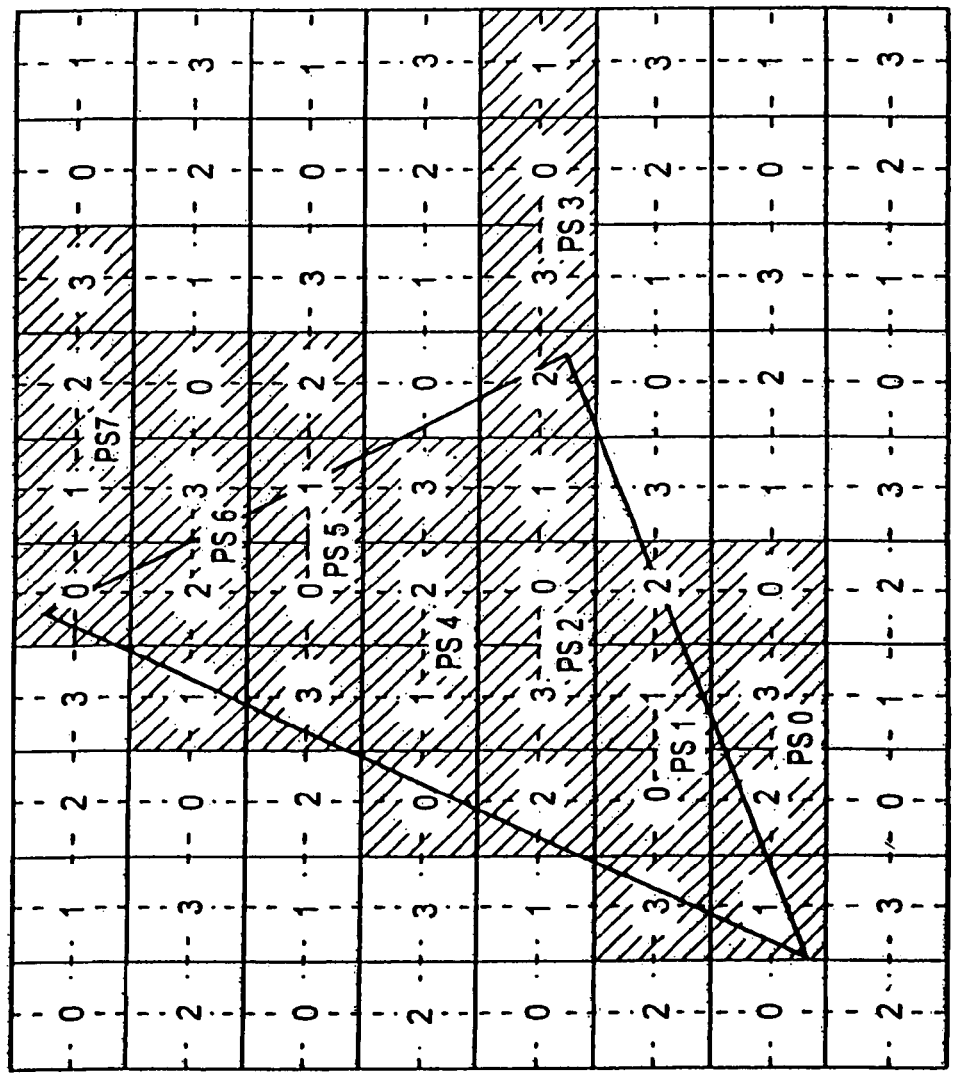
FIG. 2 is a view showing conceptually parallel processing at a primitive level based on the technique of parallel processing at the pixel level.
Figure 3:
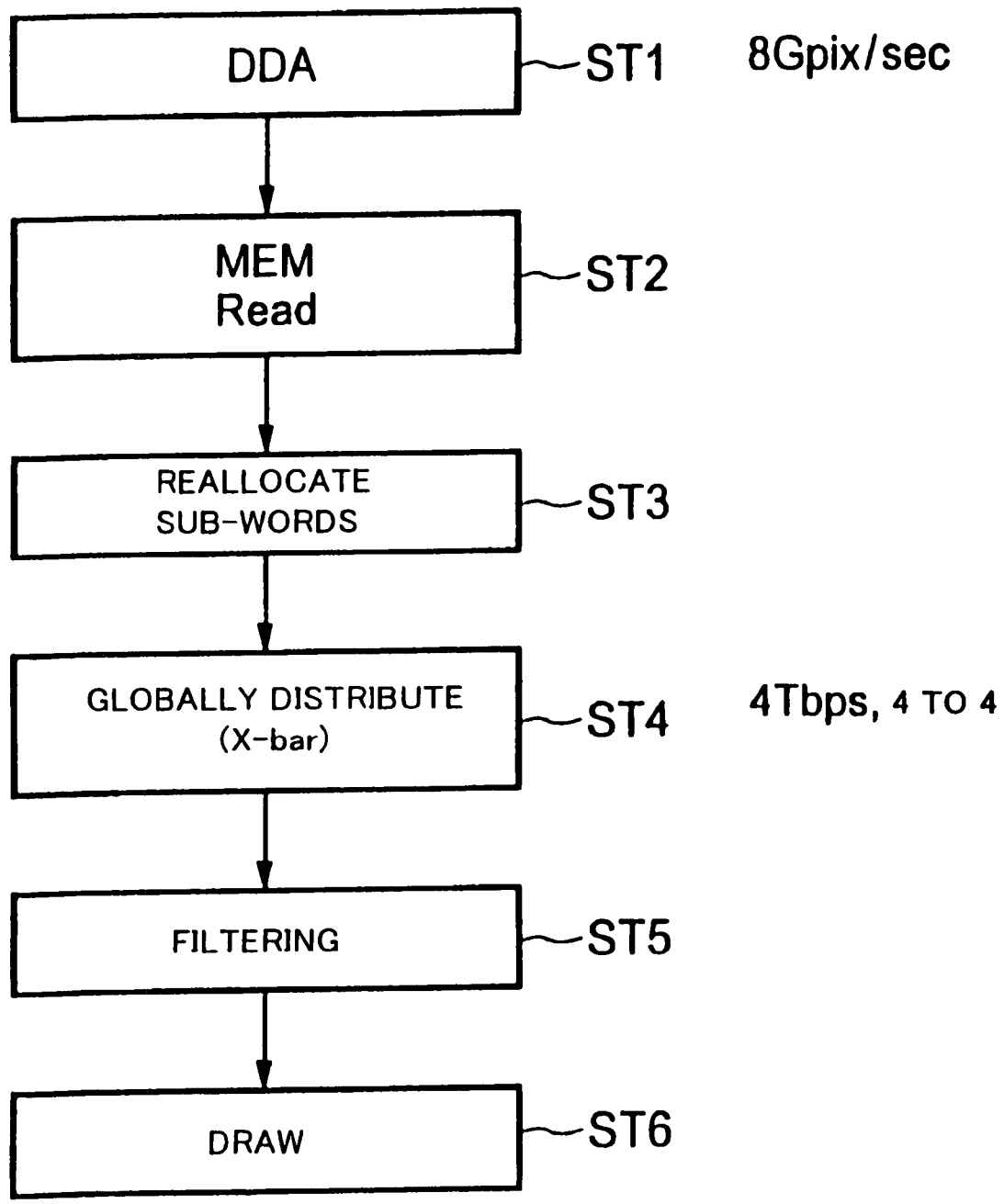
FIG. 3 is a view explaining the processing routine including texture filtering of a related image processing apparatus.
Figure 4:
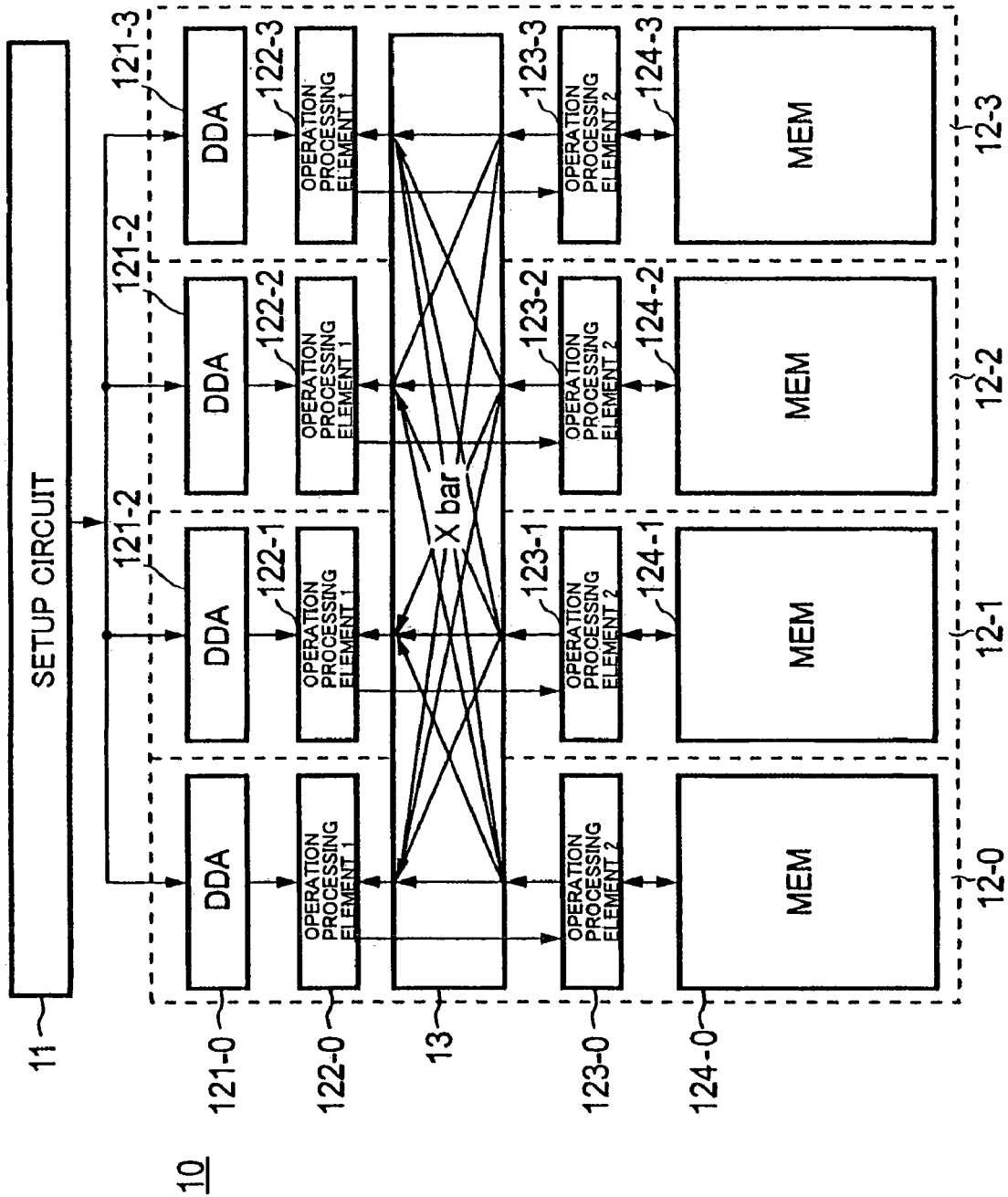
FIG. 4 is a block diagram of the configuration of an embodiment of an image processing apparatus according to the present invention.

FIG. 4 is a block diagram of the configuration of an embodiment of an image processing apparatus according to the present invention.

An image processing apparatus 10 according to the present embodiment has, as shown in FIG. 4, a setup circuit 11, processing modules 12-0 to 12-3, and a crossbar circuit 13.

In the present image processing apparatus 10, a plurality of, four in the present embodiment, processing modules 12-0 to 12-3 are connected in parallel to a setup circuit 11. A plurality of processing modules 12-0 to 12-3 share processing data to perform parallel processing.

Then, for the texture read system, memory access to other processing modules is necessary, but a crossbar circuit 13 serving as a global access bus is used for this access.

Below, the configurations and functions of the components are described sequentially with reference to the drawings.

The setup circuit 11 controls the transfer of data with a CPU and an external memory and the transfer of data with the processing modules 12-0 to 12-3, performs operations on the vertex data, sets up one primitive, and outputs the assigned texture's worth of setup information to the processing modules 12-0 to 12-3.

Specifically, the setup circuit 11 performs a per-vertex operation when data is input.

In this processing, when vertex data of the three-dimensional coordinates, normal vector, and a texture coordinates are input, an operation is performed on the vertex data. As representative operations, there are operation processing for coordinate conversion such as deformation of an object, projection on a screen, etc., operation processing for lighting, and operation processing for clipping.

The processing module 12-0 has a DDA (digital differential analyzer) circuit 121-0 as a processing circuit, a first operation processing element (operation processing element 1) 122-0, a second operation processing element (operation processing element 2) 123-0, and a memory module (MEM) 124-0 formed by a DRAM for example.

Similarly, the processing module 12-1 has a DDA circuit 121-1 as a processing circuit, a first operation processing element (operation processing element 1) 122-1, a second operation processing element (operation processing element 2) 123-1, and a memory module (MEM) 124-1 formed by a DRAM for example.

The processing module 12-2 has a DDA circuit 121-2 as a processing circuit, a first operation processing element (operation processing element 1) 122-2, a second operation processing element (operation processing element 2) 123-2, and a memory module (MEM) 124-2 formed by a DRAM for example.

The processing module 12-3 has a DDA circuit 121-3 as a processing circuit, a first operation processing element (operation processing element 1) 122-3, a second operation processing element (operation processing element 2) 123-3, and a memory module (MEM) 124-3 formed by a DRAM for example.

Then, the first operation processing elements 122-0 to 122-3 and the second operation processing elements 123-0 to 123-3 in the processing modules 12-0 to 12-3, as described in detail later, are connected to each other via the crossbar circuit 13.

Figure 5:
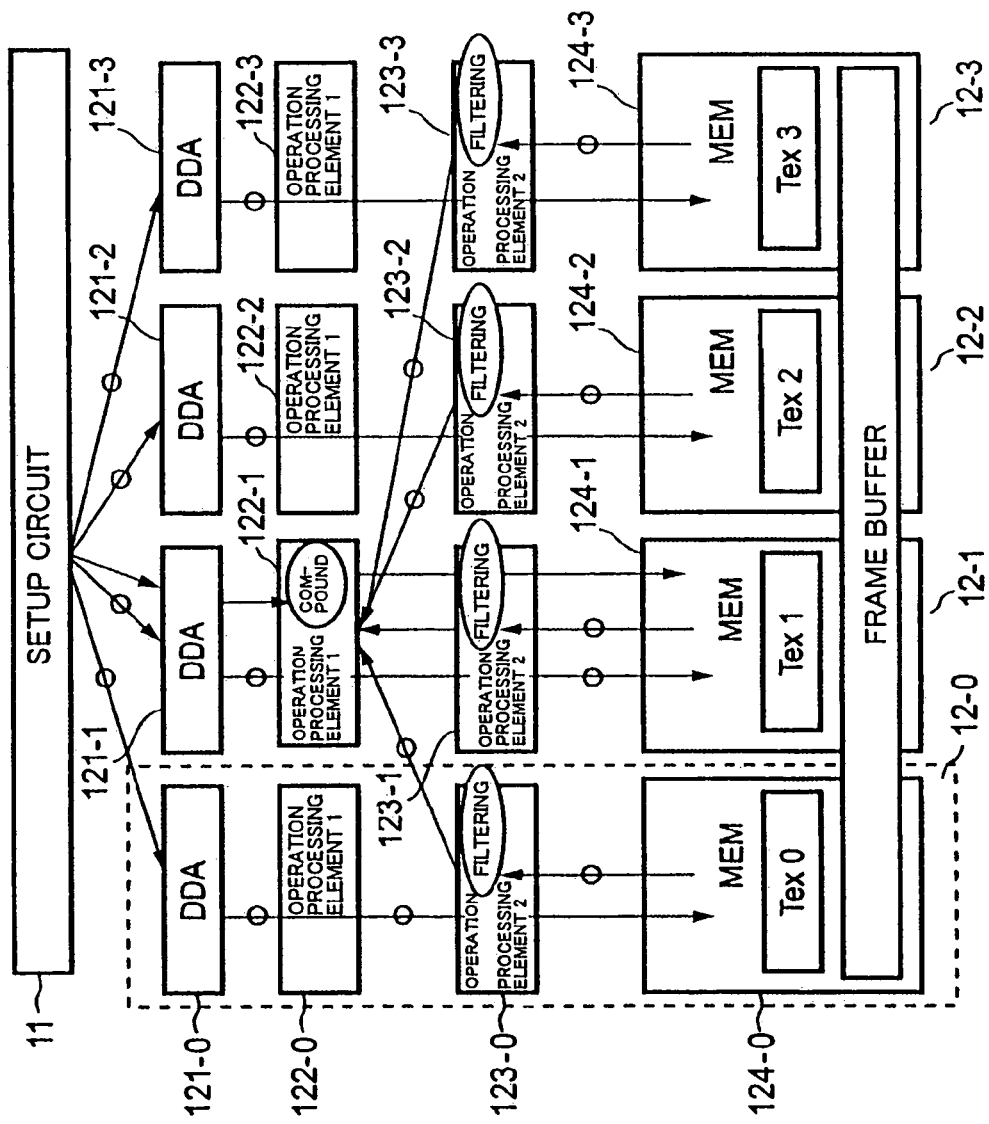
FIG. 5 is a view of the basic architecture and processing flow of an image processing apparatus according to the present embodiment.

FIG. 5 is a view of the basic architecture and a processing flow of an image processing apparatus according to the present embodiment. Note that in FIG. 5, arrows with circles indicate the flow of data relating to texture and arrows without circles indicate the flow of data relating to pixels.

In the present embodiment, in the processing modules 12-0 to 12-3, the memory modules 124-0 to 124-3 are interleaved to predetermined sizes, for example, 4×4 rectangle area units.

Specifically, as shown in FIG. 5, a so-called frame buffer is interleaved to all memory modules and texture memories are dispersed in the memory modules 124-0 to 124-3.

The DDA circuit 121-0 in the processing module 12-0 calculates DDA parameters based on information from the setup circuit 11.

In this processing, the inclinations of various types of data (Z, texture coordinates, colors, etc.) required for rasterization and other DDA parameters are calculated.

Also, the DDA circuit 121-0 judges, based on the parameter data, whether a triangle for example is in an assigned area for the circuit to process and, when in the area, performs rasterization.

Specifically, it judges whether the triangle belongs to area assigned to it, for example, an area interleaved by 4×4 pixel rectangle area units, and, when belonging to it, rasterizes various types of data (Z, texture coordinates, colors, etc.). In this case, the generated unit is 2×2 pixels per cycle per local module.

Next, the DDA circuit 121-0 corrects the perspective of the texture coordinates. This processing stage includes calculation of the MipMap level by calculation of the LOD (level of detail) and calculation of the (u, v) address for texture access.

Figure 6:
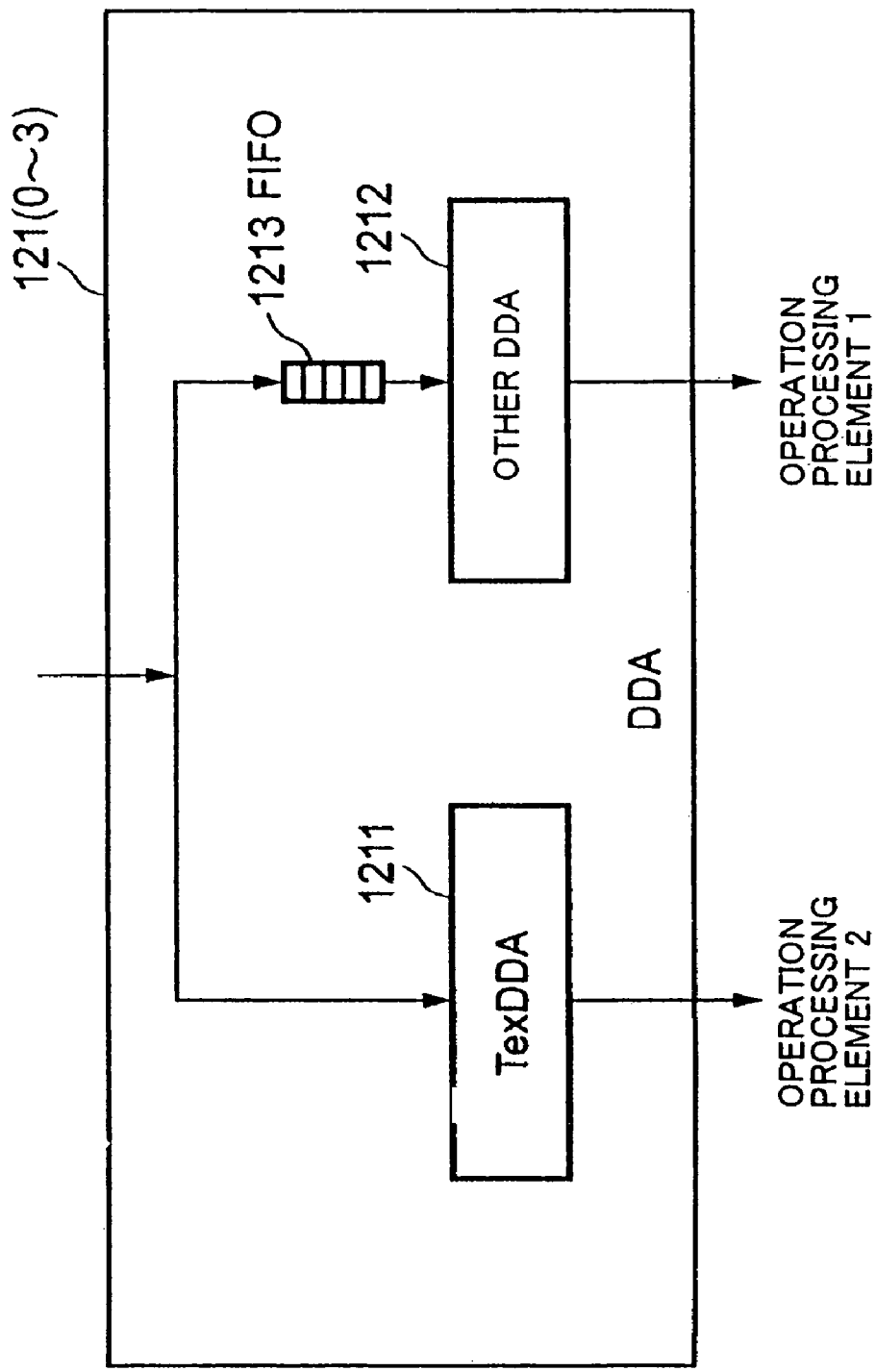
FIG. 6 is a view of an example of the configuration of key parts of a DDA circuit according to the present embodiment.

The DDA circuit 121-0, as shown in FIG. 6 for example, performs texture processing on the texture coordinates by a texture system DDA portion 1211, address information for texture access, etc. and outputs information relating to texture to the second operation processing element 123-0 via the first operation processing element 122-0 and the crossbar circuit 13.

On the other hand, the DDA circuit 121-0 performs color and other processing other than texture by another DDA portion 1212 and outputs the result to the first operation processing element 122-0.

In the present embodiment, each DDA circuit 121 (-0 to 3) is provided with a FIFO (first-in first-out) only at a data input side of the other DDA portion 1212 and adjusts the time considering the time of the filtering of the texture system.

Moreover, the texture system DDA portion 1211 generates data of the texture assigned to it for all pixels, while the other DDA portion 1212 generates only portions assigned by memory interleaving.

The first operation processing element 122-0 performs processing at the pixel level (per-pixel operation) based on data other than the texture information supplied from the DDA circuit 121-0 and data after texture filtering by the second operation processing elements 123-0 to 123-3 of the processing modules 12-0 to 12-3 received through the crossbar circuit 13 and outputs the results to the second operation processing element 123-0 via the crossbar circuit 13.

In the processing at the pixel level, the texture data after filtering and the various types of data after rasterization are used for operations on pixel units. The processing performed here corresponds to pixel-level lighting (per-pixel lighting) or other so-called pixel shader processing.

The second operation processing element 123-0 receives coordinate data and address data relating to texture supplied from the DDA circuit 121-0, reads out the texture data from the memory module 124-0, performs texture filtering, and outputs the texture data after the filtering via the crossbar circuit 13 to either of the first operation processing elements 122-0 to 122-3 in processing modules having a frame buffer corresponding to a stamp.

In this case, the second operation processing element 123-0 performs four-neighbor interpolation or other filtering by using the read texture data and a decimal fraction obtained at the time of calculation of the (u, v) address.

Moreover, the second operation processing element 123-0 receives a processing result of the pixel level supplied from the first operation processing element 122-0 and draws the pixel data passing various tests in the processing at the pixel level to the memory module 124-0.

The DDA circuit 121-1 in the processing module 12-1 calculates DDA parameters, specifically inclination of various types of data (Z, texture coordinates, colors, etc.) and other DDA parameters necessary for rasterization based on information from the setup circuit 11.

Also, the DDA circuit 121-1 judges, based on the parameter data, whether a triangle for example is its assigned area and, when the assigned area, performs rasterization.

Specifically, it judges whether the triangle is its assigned area, for example, whether it belongs in an area interleaved in 4×4 pixel rectangle area units and, when belonging, rasterizes various types of data (Z, texture coordinates, colors, etc.). In this case, the generated unit is 2×2 pixels per cycle per local module.

Next, the DDA circuit 121-1 corrects the perspective of the texture coordinates. This processing stage includes calculation of the MipMap level by calculation of the LOD (level of detail) and calculation of the (u, v) address for texture access.

The DDA circuit 121-1, as shown in FIG. 6 for example, performs texture processing on the texture coordinates by a texture system DDA portion 1211, address information for texture access, etc. and outputs information relating to texture to the second operation processing element 123-1 via the first operation processing element 122-1 and the crossbar circuit 13.

On the other hand, the DDA circuit 121-1 performs color and other processing other than texture by another DDA portion 1212 and outputs the result to the first operation processing element 122-1.

The first operation processing element 122-1 performs processing at the pixel level (per-pixel operation) based on data other than the texture information supplied from the DDA circuit 121-1 and data after texture filtering by the second operation processing elements 123-0 to 123-3 of the processing modules 12-0 to 12-3 received through the crossbar circuit 13 and outputs the results to the second operation processing element 123-1 via the crossbar circuit 13.

In the processing at the pixel level, the texture data after filtering and the various types of data after rasterization are used for operations on pixel units. The processing performed here corresponds to pixel-level lighting or other so-called pixel shader processing.

The second operation processing element 123-1 receives coordinate data and address data relating to texture supplied from the DDA circuit 121-1, reads out the texture data from the memory module 124-1, performs texture filtering, and outputs the texture data after the filtering via the crossbar circuit 13 to either of the first operation processing elements 122-0 to 122-3 in processing modules having a frame buffer corresponding to a stamp.

In this case, the second operation processing element 123-1 performs four-neighbor interpolation or other filtering by using the read texture data and a decimal fraction obtained at the time of calculation of the (u, v) address.

Moreover, the second operation processing element 123-1 receives processing results of the pixel level supplied from the first operation processing element 122-1 and draws the pixel data passing various tests in the processing at the pixel level to the memory module 124-1.

The DDA circuit 121-2 in the processing module 12-2 calculates DDA parameters, specifically inclination of various types of data (Z, texture coordinate, colors, etc.) or other DDA parameters necessary for rasterization based on information from the setup circuit 11.

Also, the DDA circuit 121-2 judges, based on the parameter data, whether a triangle for example is its assigned area and, when the assigned area, performs rasterization.

Specifically, it judges whether the triangle is its assigned area, for example, whether it belongs in an area interleaved in 4×4 pixel rectangle area units and, when belonging, rasterizes various types of data (Z, texture coordinates, colors, etc.). In this case, the generated unit is 2×2 pixels per cycle per local module.

Next, the DDA circuit 121-2 corrects the perspective of the texture coordinates. This processing stage includes calculation of the MipMap level by calculation of the LOD (level of detail) and calculation of the (u, v) address for texture access.

The DDA circuit 121-2, as shown in FIG. 6 for example, performs texture processing on the texture coordinates by a texture system DDA portion 1211, address information for texture access, etc. and outputs information relating to texture to the second operation processing element 123-2 via the first operation processing element 122-2 and the crossbar circuit 13.

On the other hand, the DDA circuit 121-2 performs color and other processing other than texture by another DDA portion 1212 and outputs the result to the first operation processing element 122-2.

The first operation processing element 122-2 performs processing at the pixel level (per-pixel operation) based on data other than the texture information supplied from the DDA circuit 121-2 and data after texture filtering by the second operation processing elements 123-0 to 123-3 of the processing modules 12-0 to 12-3 received through the crossbar circuit 13 and outputs the results to the second operation processing element 123-2 via the crossbar circuit 13.

In the processing at the pixel level, the texture data after filtering and the various types of data after rasterization are used for operations on pixel units. The processing performed here corresponds to pixel-level lighting or other so-called pixel shader processing.

The second operation processing element 123-2 receives coordinate data and address data relating to texture supplied from the DDA circuit 121-2, reads out the texture data from the memory module 124-2, performs texture filtering, and outputs the texture data after the filtering via the crossbar circuit 13 to either of the first operation processing elements 122-0 to 122-3 in processing modules having a frame buffer corresponding to a stamp.

In this case, the second operation processing element 123-2 performs four-neighbor interpolation or other filtering by using the read texture data and a decimal fraction obtained at the time of calculation of the (u, v) address.

Moreover, the second operation processing element 123-2 receives processing results of the pixel level supplied from the first operation processing element 122-2 and draws the pixel data passing various tests in the processing at the pixel level to the memory module 124-2.

The DDA circuit 121-3 in the processing module 12-3 calculates DDA parameters, specifically inclination of various types of data (Z, texture coordinate, colors, etc.) or other DDA parameters necessary for rasterization based on information from the setup circuit 11.

Also, the DDA circuit 121-3 judges, based on the parameter data, whether a triangle for example is its assigned area and, when the assigned area, performs rasterization.

Specifically, it judges whether the triangle is its assigned area, for example, whether it belongs in an area interleaved in 4×4 pixel rectangle area units and, when belonging, rasterizes various types of data (Z, texture coordinates, colors, etc.). In this case, the generated unit is 2×2 pixels per cycle per local module.

Next, the DDA circuit 121-3 corrects the perspective of the texture coordinates. This processing stage includes calculation of the MipMap level by calculation of the LOD (level of detail) and calculation of the (u, v) address for texture access.

The DDA circuit 121-3, as shown in FIG. 6 for example, performs texture processing on the texture coordinates by a texture system DDA portion 1211, address information for texture access, etc. and outputs information relating to texture to the second operation processing element 123-3 via the first operation processing element 122-3 and the crossbar circuit 13.

On the other hand, the DDA circuit 121-3 performs color and other processing other than texture by another DDA portion 1212 and outputs the result to the first operation processing element 122-3.

The first operation processing element 122-3 performs processing at the pixel level (per-pixel operation) based on data other than the texture information supplied from the DDA circuit 121-3 and data after texture filtering by the second operation processing elements 123-0 to 123-3 of the processing modules 12-0 to 12-3 received through the crossbar circuit 13 and outputs the results to the second operation processing element 123-3 via the crossbar circuit 13.

In the processing at the pixel level, the texture data after filtering and the various types of data after rasterization are used for operations on pixel units. The processing performed here corresponds to pixel-level lighting or other so-called pixel shader processing.

The second operation processing element 123-3 receives coordinate data and address data relating to texture supplied from the DDA circuit 121-3, reads out the texture data from the memory module 124-3, performs texture filtering, and outputs the texture data after the filtering via the crossbar circuit 13 to either of the first operation processing elements 122-0 to 122-3 in processing modules having a frame buffer corresponding to a stamp.

In this case, the second operation processing element 123-3 performs four-neighbor interpolation or other filtering by using the read texture data and a decimal fraction obtained at the time of calculation of the (u, v) address.

Moreover, the second operation processing element 123-3 receives processing results of the pixel level supplied from the first operation processing element 122-3 and draws the pixel data passing various tests in the processing at the pixel level to the memory module 124-3.

Figure 7:
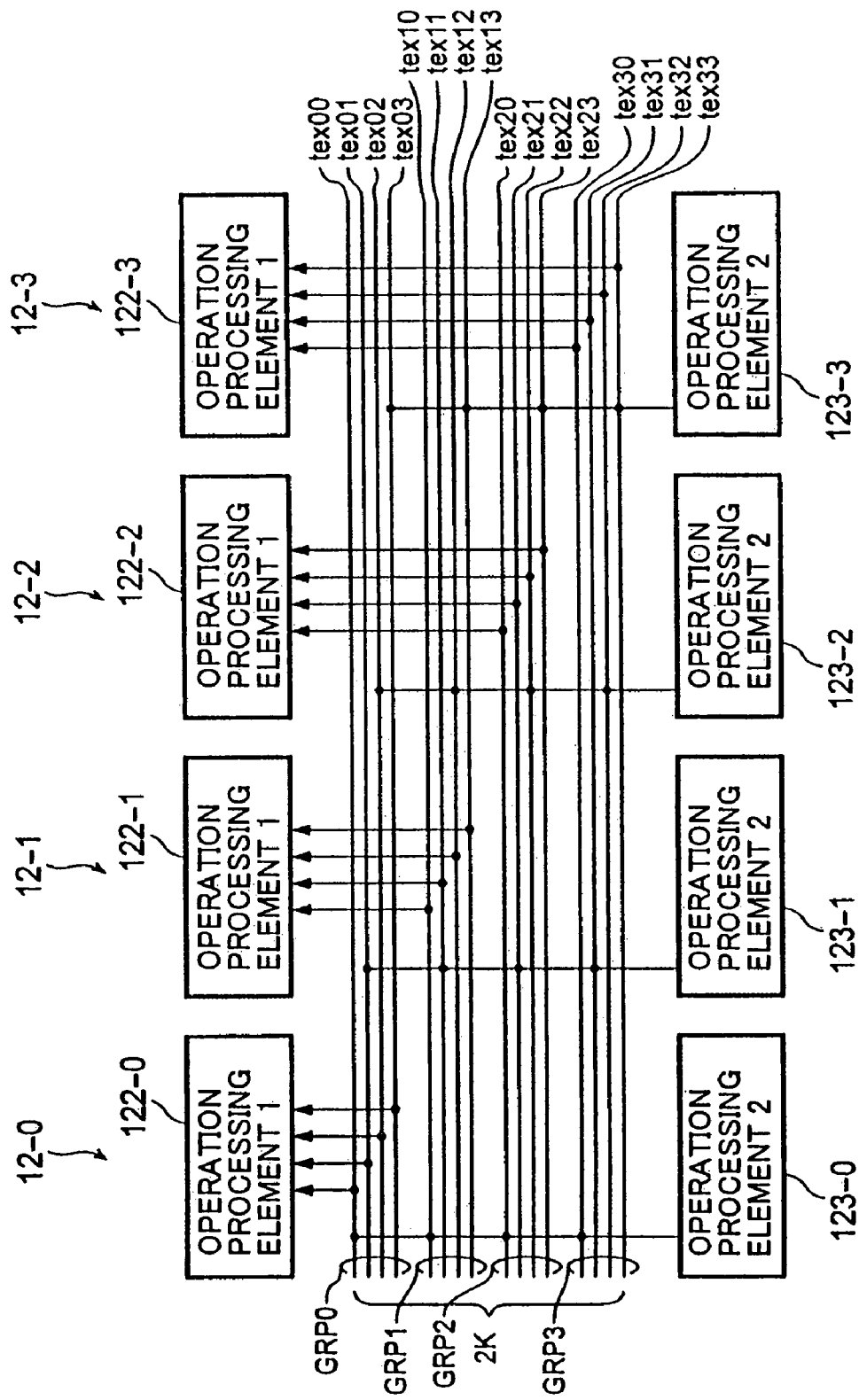
FIG. 7 is a view of a concrete example of the configuration of a crossbar circuit according to the present embodiment.

FIG. 7 is a view of a concrete example of the configuration of a global bus system in a crossbar circuit according to the present embodiment.

The crossbar circuit 13, as shown in FIG. 7, has four groups of a first to a fourth interconnect group GRP0 to GRP3, four texture lines forming one group.

A first interconnect group GRP0 has four interconnects tex00 to tex03, a second interconnect group GRP1 has four interconnects tex10 to tex13, a third interconnect group GRP1 has four interconnects tex20 to tex23, and a fourth interconnect group GRP1 has four interconnects tex30 to tex33.

Further, a terminal of the second operation processing element 123-0 in the processing module 12-0 is connected to the interconnect tex00 in the first interconnect group GRP0, the interconnect tex10 in the second interconnect group GRP1, the interconnect tex20 in the third interconnect group GRP2, and the interconnect tex30 in the fourth interconnect group GRP3.

In the same way, a terminal of the second operation processing element 123-1 in the processing module 12-1 is connected to the interconnect tex01 in the first interconnect group GRP0, the interconnect tex11 in the second interconnect group GRP1, the interconnect tex21 in the third interconnect group GRP2, and the interconnect tex31 in the fourth interconnect group GRP3.

A terminal of the second operation processing element 123-2 in the processing module 12-2 is connected to the interconnect tex02 in the first interconnect group GRP0, the interconnect tex12 in the second interconnect group GRP1, the interconnect tex22 in the third interconnect group GRP2, and the interconnect tex32 in the fourth interconnect group GRP3.

A terminal of the second operation processing element 123-3 in the processing module 12-3 is connected to the interconnect tex03 in the first interconnect group GRP0, the interconnect tex13 in the second interconnect group GRP1, the interconnect tex23 in the third interconnect group GRP2, and the interconnect tex33 in the fourth interconnect group GRP3.

The four interconnects tex00-tex03 in the first interconnect group GRP0 are connected to the terminal of the first operation processing element 122-0 in the processing module 12-0.

In a same way, the four interconnects tex10-tex13 in the second interconnect group GRP1 are connected to the terminal of the first operation processing element 122-1 in the processing module 12-1.

The four interconnects tex20-tex23 in the third interconnect group GRP2 are connected to the terminal of the first operation processing element 122-2 in the processing module 12-2.

The four interconnects tex30-tex33 in the fourth interconnect group GRP3 are connected to the terminal of the first operation processing element 122-3 in the processing module 12-3.

Figure 8:
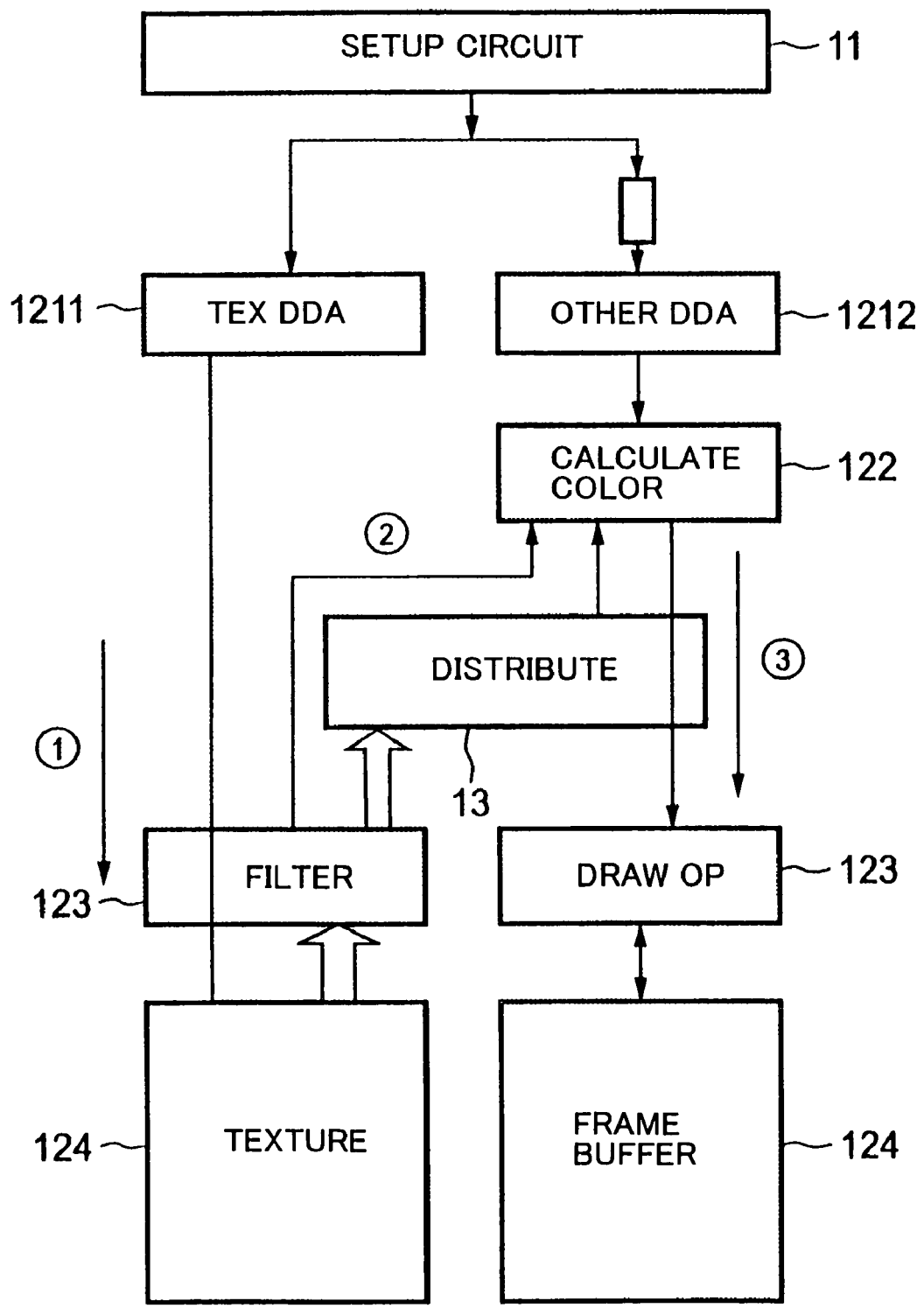
FIG. 8 is a view describing conceptually the processing of the image processing apparatus according to the present embodiment.

Processing in an image processing apparatus 10 having such a configuration is performed as shown conceptually in FIG. 8.

That is, the data from the setup circuit 11 is distributed in the modules to the texture DDA portion 1211 and the other DDA portion 1212. Texture-filtering is performed by the second operation processing element 123 based on texture information from the texture DDA portion 1211 and texture data in the memory 124 (flow of data indicated by (1)).

The texture data after the filtering is distributed by the crossbar circuit 13 to the first operation processing element 122 in a requested module (flow of data indicated by (2)).

Then, processing at the pixel level is performed in the first operation processing element 122 and the result is sent to the second operation processing element 123 via the crossbar circuit 13, thus the data is drawn in the memory module 124 (flow of data indicated by (3)).

Next, the operation by the configuration of the above FIG. 4 will be described with reference to FIG. 5.

First, the setup circuit 11 performs an operation on the vertex data, sets up a primitive, and outputs the assigned texture's worth of setup information to the processing modules 12-0 to 12-3.

The DDA circuits 121-0 to 121-3 in the processing modules 12-0 to 12-3 calculate DDA parameters, specifically inclination of various types of data (Z, texture coordinates, colors, etc.) or other DDA parameters necessary for rasterization based on information from the setup circuit 11.

The DDA circuits 121-0 to 121-3 judge, based on the parameter data, whether for example a triangle for is its assigned area and, when its assigned area, performs rasterization.

Moreover, the DDA circuits 121-0 to 121-3 calculate the mipmap level by calculating the LOD and calculates the (u, v) address calculation for texture access.

Then, the DDA circuits 121-0 to 121-3 output texture coordinates obtained by the texture system DDA portion 1211 and address information for texture access etc. to the second operation processing elements 123-0 to 123-3 via the first operation processing elements 122-0 to 122-3 and the crossbar circuit 13.

On the other hand, the DDA circuits 121-0 to 121-3 supply color and other information other than texture obtained by the other DDA portion 1212 to the first operation processing elements 122-0 to 122-3.

The second operation processing elements 123-0 to 123-3 in the processing modules 12-0 to 12-3 receive coordinate data and address data relating to texture supplied from the DDA circuits 121-0 to 121-3, reads out texture data from the memory modules 124-0 to 124-3, then performs four-neighbor interpolation or other texture filtering using the read texture data and a decimal fraction obtained by calculation of the (u, v) address.

The texture data after the filtering from the second operation processing elements 123-0 to 123-3 are supplied via the crossbar circuit 13 to the first operation processing element 122-1 in, for example, the processing module 12-1 having a frame buffer corresponding to a stamp.

The first operation processing element 122-1 in the processing module 12-1 performs processing at the pixel level based on data other than texture information supplied from the DDA circuit 121-1 and data after texture filtering by the second operation processing elements 123-0 to 123-3 of the processing modules 12-0 to 12-3 received via the crossbar circuit 13 and outputs the results to the second operation processing element 123-1.

Then, the second operation processing element 123-1 receives the processing results at the pixel level supplied by the first operation processing element 122-1 and draws the pixel data passing various types of tests in the processing at the pixel level in the memory module 124-1.

The above processing is performed in parallel at the modules.

Figure 9:
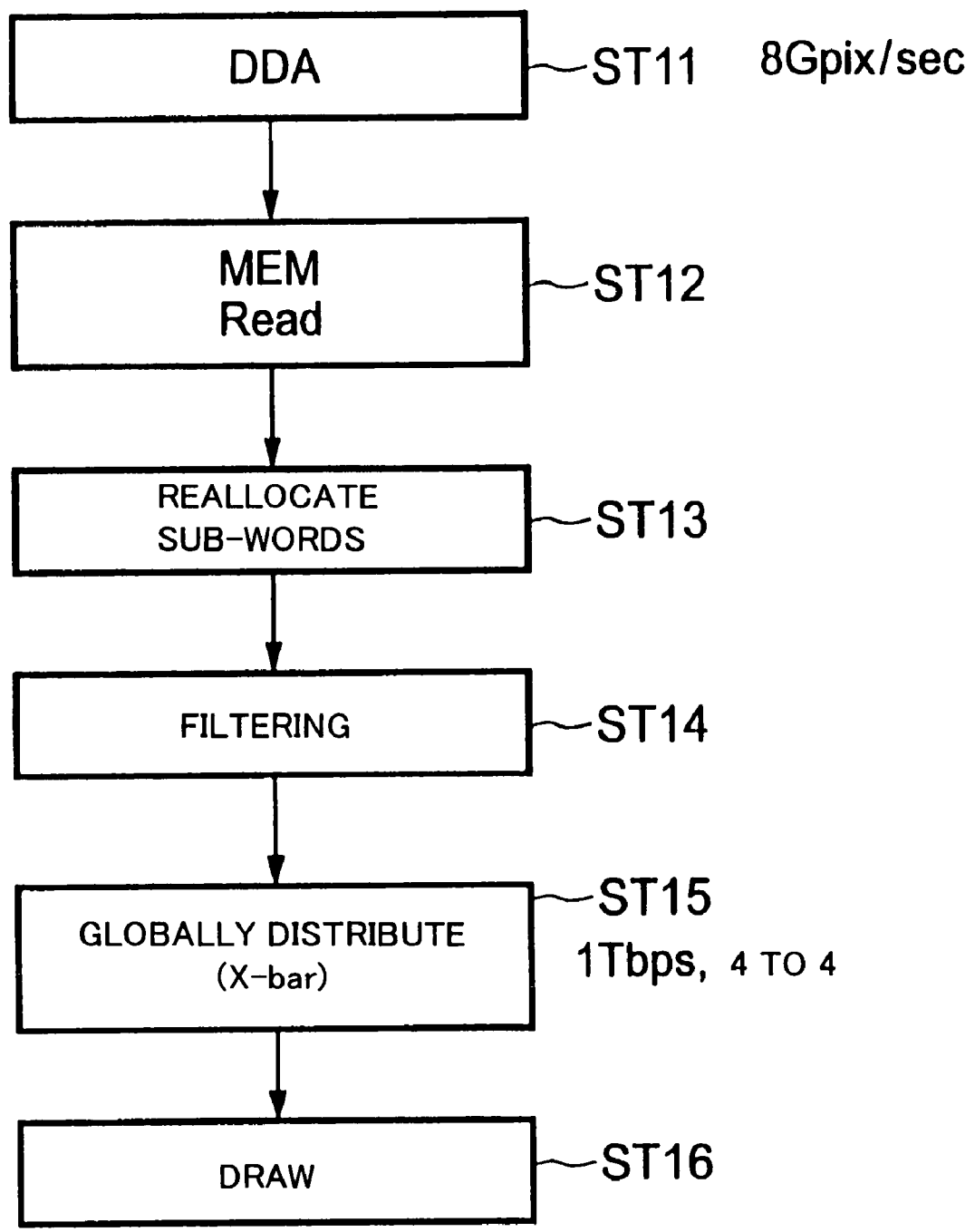
FIG. 9 is a view of the conceptual processing flow of an image processing apparatus according to the present embodiment.

As described above, the present embodiment, as shown in FIG. 9, performs DDA processing (ST11), then reads out texture data from a memory (ST12), performs sub-word reallocation processing (ST13), then performs texture filtering (ST14), then globally distributes data by the crossbar circuit 13 to a first operation processing element of each processing module (ST15), then performs processing at the pixel level, specifically uses the texture data after filtering and the various types of data after rasterization to perform operations by pixel units and draws the pixel data passing the various types of tests in the processing at the pixel level to a frame buffer on a memory module (ST16), so can exhibit the following effects.

That is, since the data is distributed after being decreased by filtering, the crossbar circuit 13 serving as a global bus can be made small in size.

Further, since the flow of data before the filtering can be localized, the path from a memory module requiring a wide bandwidth to a second operation processing element is localized and thus a higher speed of processing can be achieved.

As a result, there is the advantage that it is possible to realize an image processing apparatus which is easy to design and which can reduce the interconnect cost and interconnect delay.

INDUSTRIAL APPLICABILITY

As described above, an image processing apparatus and method thereof according to the present invention can reduce the number of interconnects of a crossbar circuit and make the circuit small in size when a plurality of processing apparatuses share processing data to perform parallel processing. As a result, the design is easy and the interconnect cost and interconnect delay can be reduced, so the invention can be applied to a graphics LSI etc.

The invention claimed is:

1. An image processing apparatus, comprising:
a plurality of processing modules configured to share processing data and perform parallel processing, the plurality of processing modules each comprising:
a memory module for storing at least data relating to filtering;
a processing circuit for obtaining data for filtering and performing assigned processing determined in advance by corresponding memory interleaving based on the processing data;
a first operation processing element for performing operation processing in pixel units based on assigned processing data and data after filtering; and
a second operation processing element for performing filtering based on the data for filtering and the data relating to filtering and receiving operation processing data from said first operation processing element, then drawing the operation processed data to the memory module; and
a crossbar circuit for connecting the first operation processing elements with the second operation processing elements of said processing modules, supplying the data for filtering obtained by the processing circuit in each processing module to the second operation processing element in the same processing module, supplying the data after filtering from the second operation processing element in each processing module to the first operation processing element in a predetermined processing module, and supplying the operation processing data from the first operation processing element of each processing module to the second operation processing element in the same processing module.

2. An image processing apparatus as set forth in claim 1, wherein the processing circuit of each processing module comprises a means for adjusting time so that the assigned processing is performed when the data after filtering is supplied to the first operation processing element.

3. An image processing apparatus as set forth in claim 1, further comprising a setup circuit for performing an operation on vertex data of a primitive, setting up one primitive, and outputting the assigned processing data to the processing circuits of the processing modules.

4. An image processing apparatus as set forth in claim 1, wherein the data for filtering is data relating to texture.

5. An image processing apparatus as set forth in claim 1, wherein said parallel processing is parallel processing at the pixel level.

* * * * *